United States Patent
Makar et al.

(10) Patent No.: US 9,911,175 B2
(45) Date of Patent: Mar. 6, 2018

(54) MODIFICATION OF GRAPHICAL COMMAND TOKENS

(71) Applicant: QUALCOMM Incorporated, San Diego, CA (US)

(72) Inventors: Mina Ayman Saleh Yanni Makar, San Diego, CA (US); Vijayalakshmi Rajasundaram Raveendran, San Diego, CA (US); Xiaodong Wang, San Diego, CA (US); Hongyu Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 14/845,082

(22) Filed: Sep. 3, 2015

(65) Prior Publication Data

US 2017/0069053 A1 Mar. 9, 2017

(51) Int. Cl.
| | |
|---|---|
| *G06T 1/20* | (2006.01) |
| *H04N 5/44* | (2011.01) |
| *H04N 13/04* | (2006.01) |
| *G06F 3/14* | (2006.01) |
| *G06T 19/20* | (2011.01) |

(52) U.S. Cl.
CPC ............ *G06T 1/20* (2013.01); *G06F 3/1454* (2013.01); *G06T 19/20* (2013.01); *H04N 5/4401* (2013.01); *H04N 13/0497* (2013.01)

(58) Field of Classification Search
None
See application file for complete search history.

(56) References Cited

U.S. PATENT DOCUMENTS

| | | | |
|---|---|---|---|
| 6,222,558 B1 | 4/2001 | Berg | |
| 6,263,101 B1* | 7/2001 | Klein | .............. G06T 11/001 |
| | | | 358/518 |
| 7,027,062 B2 | 4/2006 | Lindholm et al. | |
| 8,674,957 B2 | 3/2014 | Raveendran et al. | |
| 8,745,173 B1 | 6/2014 | Tidd | |
| 8,964,783 B2 | 2/2015 | Huang et al. | |
| 2006/0253245 A1* | 11/2006 | Cera | ................. G06F 3/04815 |
| | | | 701/117 |
| 2011/0292181 A1* | 12/2011 | Acharya | ............... G06F 3/011 |
| | | | 348/47 |
| 2013/0047189 A1 | 2/2013 | Raveendran et al. | |
| 2013/0191816 A1 | 7/2013 | Zhang et al. | |

(Continued)

OTHER PUBLICATIONS

Walczak, Krzysztof, and Wojciech Cellary. "X-VRML for advanced virtual reality applications." Computer 36.3 (2003): 89-92.*

(Continued)

*Primary Examiner* — Zhengxi Liu
(74) *Attorney, Agent, or Firm* — Shumaker & Sieffert, P.A.

(57) ABSTRACT

In one example, a method for processing video data includes receiving, by a sink device and from a source device, one or more graphical command tokens that are executable to render original video data; modifying, by the sink device, the graphical command tokens to generate modified graphical command tokens that are executable to render modified video data different from the original video data; and outputting, for presentation at a display operatively connected to the sink device, the modified video data.

29 Claims, 7 Drawing Sheets

(56) References Cited

U.S. PATENT DOCUMENTS

2014/0333639 A1 11/2014 Dodge et al.

OTHER PUBLICATIONS

Unknown, "Architectures of XVRML Systems (Dynamic Database Modeling of 3D Multimedia Content)," archived on Dec. 17, 2012, retrieved from https://web.archive.org/web/20121217080618/http://what-when-how.com/interactive-3d-multimedia-content/architectures-of-x-vrml-systems-dynamic-database-modeling-of-3d-multimedia-content/ on Jun. 26, 2017.*
Response to Written Opinion from corresponding PCT Application Serial No. PCT/US2016/046042 filed on Mar. 17, 2017 (22 pages).
Segal, Mark et al., "The OpenGL Graphics System: A Specification", Version 4.5 (Core Profile), May 28, 2015, 831 pp.
LG Mobile Developer Network, "3D Game Converter, HRZ Engine", Mobile Communication Company Mobile Handset R&D Center, Version 1. 5, Feb. 14, 2012, 21 pages.
Chronos OpenCL Workign Group, "The OpenCL Specification", Version 2.1; Document Revision 23, Nov. 11, 2015, 300 pp.
Kronos Group, "Vulkan: Graphics and Compute Belong Together", GDC; Mar. 2015, 14 pp.
Zink et al., "Practical Rendering & Computation with Direct3D 11," Overview of Direct 3D, CRC Press, Nov. 2, 2011, 7 pp.
"Graphics Pipeline," Windows, Dec Center—Desktop, retrieved on Mar. 15, 2013 from http://msdn.microsoft.com/en-us/enus/%20library/windows/desktop/ff476882%28v=vs.85%29.aspx, 2 pp.
Gee, Kevin, "Introduction to the Direct3D 11 Graphics Pipeline", XNA Developer Connection, Microsoft Corporation, Nvision 08, Aug. 25 through 27, 2008, 55 pp.
IEEE Computer Society; "Part 11: Wireless LAN Medium Access Control (MAC) and Physical-Layer (PHY) Specifications: Amendment 4: Enhancements for Very High Throughput for Operation in Bands below 6 GHz", IEEE Standard for Information technology—Telecommunications and information exchange between systems Local and metropolitan area networks—Specific requirements; Sponsored by LAN/Mad Standards Committee; IEEE Standard 802.11acTM-2013 Published on Dec. 18, 2013; 425 pp.
IEEEComputer Society; "Part 11: Wireless LAN Medium Access Control (MAC) and Physical Layer (PHY) Specifications: Amendment 3: Enhancements for Very High Throughput in the 60 GHz Band", IEEE Standard for Infomiation technology—Telecommunications and information exchange between systems Local and metropolitan area networks—Specific requirements; Sponsored by LAN/Mad Standards Committee; IEEE Standard 802.11adTM-2012 Dec. 28, 2012; 628 pp.
IEEE Computer Society; "Part 11: Wireless LAN Medium Access Control (MAC) and Physical Layer (PHY) Specifications: Amendment 1: Prioritization of Management Frames", IEEE Standard for Information technology-Telecommunications and information exchange between systems Local and metropolitan area networks—Specific requirements; Sponsored by LAN/Mad Standards Committee; IEEE Standard 802.11aeTM-2012 (Amendment to IEEE Std 802.11™-2012) Apr. 6, 2012; 52 pp.
IEEE Computer Society; "Part 11: Wireless LAN Medium Access Control (MAC) and Physical Layer (PHY) Specifications: Amendment 5: Television White Spaces (TVWS) Operation", IEEE Standard for Information technology—Telecommunications and information exchange between systems Local and metropolitan area networks—Specific requirements; Sponsored by LAN/Mad Standards Committee; IEEE Standard 802.11afTM-2013 Published on Feb. 21, 2014;198 pp.
IEEE Computer Society; "Part 11: Wireless LAN Medium Access Control (MAC) and Physical Layer (PHY) Specifications", IEEE Standard for Information technology—Telecommunications and information exchange between systems Local and metropolitan area networks—Specific requirements; Sponsored by LAN/Mad Standards committee; IEEE Standard 802.11TM-2012 (Revision of IEE Standard 802.11-2007), Mar. 29, 2012; 2793 pp.
IEEE Computer Society; "Part 11: Wireless LAN Medium Access Control (MAC) and Physical Layer (PHY) Specifications: Amendment 2 MAC Enhancements for Robust Audio Video Streaming", IEEE Standard for Information technology—Telecommunications and information exchange between systems Local and metropolitan area networks—Specific requirements; Sponsored by LAN/Mad Standards Committee; IEEE Standard 802.11aaTM-2012 (Amendment to IEEE standard 802.11TM-2012, as amended by IEEE Std 802.11ae™-2012), May 29, 2012; 162 pp.
International Search Report and Written Opinion from International Application No. PCT/US2016/046042 , dated Oct. 26, 2016, 11 pp.
International Preliminary Report on Patentability from corresponding PCT Application Serial No. PCT/US2016/046042 dated Nov. 17, 2017 (23 pages).
Second Written Opinion from corresponding PCT Application Serial No. PCT/US2016/046042 dated Aug. 11, 2017 (7 pages).

* cited by examiner

MODIFICATION OF GRAPHICAL COMMAND TOKENS

TECHNICAL FIELD

This disclosure relates to techniques for processing video streaming from a source device to a sink device.

BACKGROUND

Wireless display (WD) systems include a source device and one or more sink devices. The source device and each of the sink devices may be either mobile devices or wired devices with wireless communication capabilities. As mobile devices, for example, one or more of the source device and the sink devices may comprise mobile telephones, tablet computers, laptop computers, portable computers with wireless communication cards, personal digital assistants (PDAs), wireless gaming devices, portable media players, or other flash memory devices with wireless communication capabilities. Mobile devices may also include so-called "smart" phones and "smart" pads or tablets, or other types of wireless communication devices. As wired devices, for example, one or more of the source device and the sink devices may comprise televisions, desktop computers, monitors, projectors, and the like, that include wireless communication capabilities.

The source device sends media data, such as audio and/or video data, to one or more of the sink devices participating in a particular communication session. The media data may be played back at both a local display of the source device and at each of the displays of the sink devices. More specifically, each of the participating sink devices renders the received media data on its display and audio equipment.

SUMMARY

In one example, a method for processing video data includes receiving, by a sink device and from a source device, one or more graphical command tokens that are executable to render original video data; modifying, by the sink device, the graphical command tokens to generate modified graphical command tokens that are executable to render modified video data different from the original video data; and outputting, for presentation at a display operatively connected to the sink device, the modified video data.

In another example, a sink device includes a communication unit configured to receive, from a source device, graphical command tokens that are executable to render original video data; and one or more processors. In this example, the one or more processors are configured to modify the graphical command tokens to generate modified graphical command tokens that are executable to render modified video data; and output, for presentation at a display operatively connected to the sink device, the modified video data.

In another example, a sink device includes means for receiving, from a source device, one or more graphical command tokens that are executable to render original video data; means for modifying the graphical command tokens to generate modified graphical command tokens that are executable to render modified video data different from the original video data; and means for outputting, for presentation at a display operatively connected to the sink device, the modified video data.

In another example, a computer-readable storage medium stores instructions that, when executed, cause one or more processors of a sink device to receive, from a source device, one or more graphical command tokens that are executable to render original video data; modify the graphical command tokens to generate modified graphical command tokens that are executable to render modified video data different from the original video data; and output, for presentation at a display operatively connected to the sink device, the modified video data.

The details of one or more examples are set forth in the accompanying drawings and the description below. Other features, objects, and advantages will be apparent from the description and drawings, and from the claims.

DETAILED DESCRIPTION

Figure 1:
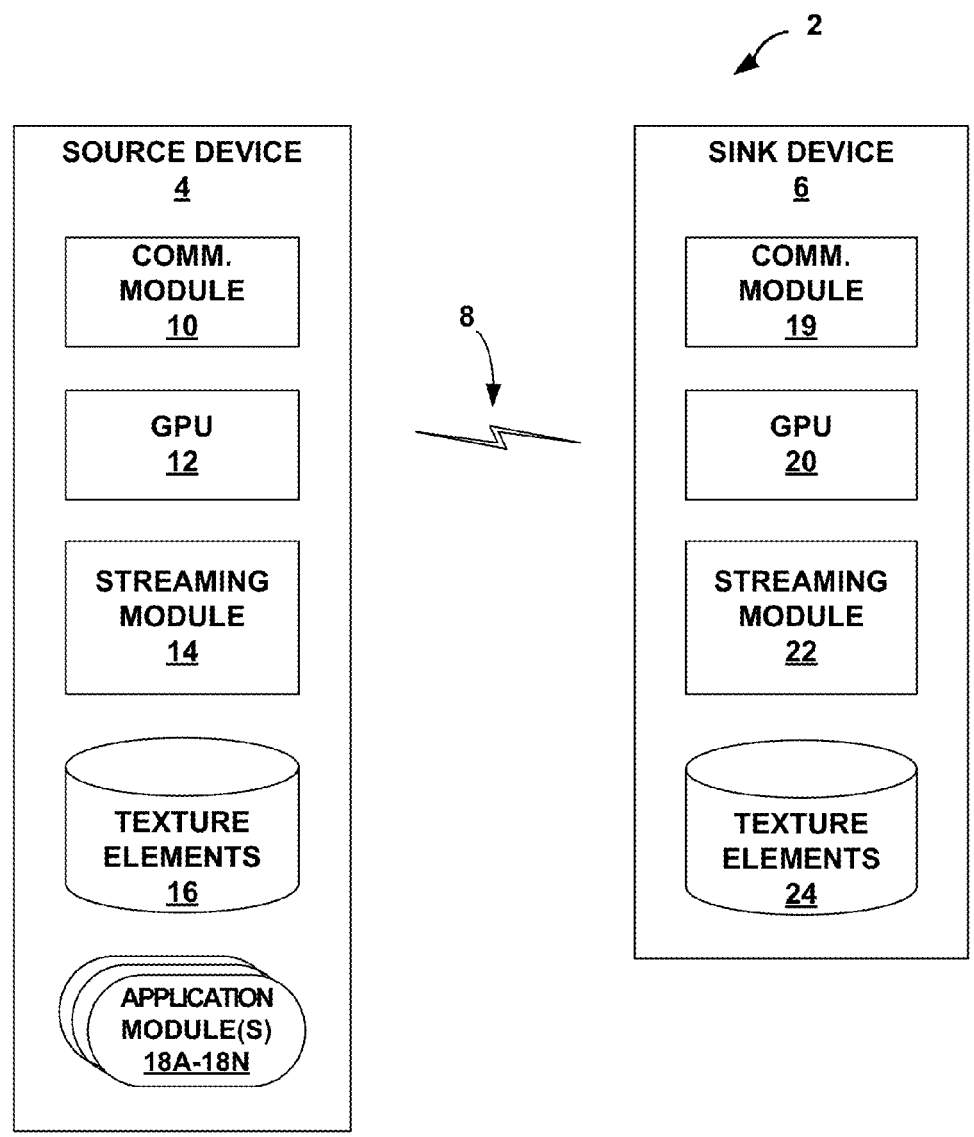
FIG. 1 is a conceptual diagram of an example wireless display (WD) system in which a device is configured to modify graphical command tokens, in accordance with one or more techniques of this disclosure.

This disclosure describes techniques for streaming video from a source device to a sink device. In some examples, a source device may stream video to a sink device by capturing constructed frames from a frame buffer of the source device, and transmitting the captured frames to the sink device, which may then display the images at a display of the sink device. This method may be referred to as a "pixel domain" transmission method, e.g., where the frame comprises an array of pixels. However, in some examples, it may not be desirable to use the pixel domain method due to the high average data rate required for transmission of the captured images.

Alternatively, in some examples, a "graphics domain" transmission method may be used by a source device to stream deconstructed video frames (i.e., video frames in a non-raster format) to a sink device. Graphics domain transmission may be accomplished by capturing display data at an input of a graphics processing unit (GPU) of the source device in the form of graphical command tokens (e.g., tokens/instances of OpenGL commands and their operands) and texture elements, transmitting the graphical command tokens and texture elements to the sink device. A GPU of the sink device may execute the graphical command tokens to render displayable frames based on the texture elements (i.e., by referencing the texture elements), and output the rendered frames of video data at the display of the sink device.

In some cases, it may be desirable to modify the video data output at the display of the sink device. To avoid a degraded streaming experience, it may be desirable to perform the modification in real-time (or in near real-time) so as to avoid artifacts that can result from delay. When utilizing the pixel domain transmission method, it may not be possible to modify the captured frames in real-time (or in near real-time). However, when utilizing the graphics domain transmission method, it is possible to modify the captured frames in real-time (or in near real-time). For instance, as opposed to the pixel domain method where the captured frame may be stored and modified at a later time, by utilizing the graphics domain transmission method, the captured frames may be modified close to the time (e.g., within 100 milliseconds, 1 second, 5 seconds) of the time when the frames were captured.

In operation, a sink device may receive graphical command tokens that are renderable into original video data. For instance, the sink device may receive the graphical command tokens wirelessly from a source device.

In accordance with one or more techniques of this disclosure, the sink device may modify the graphical command tokens to generate modified graphical command tokens that are executable to render modified video data that is different than the original video data. The sink device may execute the modified graphical command tokens and output the modified video data for presentation at a display operatively connected to the sink device. In this way, the graphical command tokens may be modified (e.g., in real-time) to cause the sink device to output modified video data, i.e., video data that has been modified relative to the original video data in some way. The modification to the graphical command tokens may be any of a variety of modifications, or combinations of such modifications, that result, in general, in a modification to the visual appearance of the video data that is presented to a user.

Some example modifications that a sink device may make to the graphical command tokens include, but are not limited to, image processing point operations (e.g., color conversions such as Grayscale adjustment, blurring, sharpening, etc.), image processing filters with artistic effects (Instagram-like filters), resolution changes (e.g., to render at higher lower spatial resolution or larger or smaller size, e.g., for partial covering of the display to allow multiple apps, etc.), viewpoint changes for three-dimensional (3D) objects, and replacing texture elements. The modifications to the graphical command tokens that are performed by the sink device can be general for any application (for example, Grayscale effect), or application-specific (for example, changing 3D viewpoint of a specific object in a specific application). The modifications can be partial or for the whole view (for example, adding an effect on figures of a PDF document in Adobe Reader but not adding the effect on text). The modifications can be adaptive. For example, the browser output at the display of the sink device may include a whole webpage if viewed by company employees, but may blur certain parts if viewed by non-employees/guests.

FIG. 1 is a conceptual diagram of an example wireless display (WD) system in which a device is configured to modify graphical command tokens, in accordance with one or more techniques of this disclosure. As illustrated in FIG. 1, WD system 2 includes source device 4, sink device 6, and communication channel 8.

Communication channel 8 may be any channel capable of propagating communicative signals between source device 4 and sink device 6. In some examples, communication channel 8 may be a wireless communication channel. For instance, communication channel 8 may be implemented in radio frequency communications in frequency bands such as the 2.4 gigahertz (GHz) band, the 5 GHz band, the 60 GHz band, or other frequency bands. In some examples, communication channel 8 may comply with one or more sets of standards, protocols, or technologies such as wireless universal serial bus (WUSB) (as promoted by the USB Implementers Forum), Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), or other standards, protocols, or technologies. The 2012 revision of the 802.11 specification is set forth at http://standards.ieee.org/getieee802/download/802.11-2012.pdf. The frequency bands used, such as the 2.4 GHz, 5 GHz, and 60 GHz bands, may be defined for purposes of this disclosure as they are understood in light of the standards of Wi-Fi, WiGig, any one or more of the IEEE 802.11 protocols, or other applicable standards or protocols.

WD 2 may include source device 4 which may be configured to transmit video data in the form of graphical command tokens to a sink device, such as sink device 6, over a communication channel, such as communication channel 8. Examples of source device 4 may include, but are not limited to mobile devices such as smartphones or other mobile handsets, tablet computers, laptop computers, desktop computers, wearable computing devices (e.g., smart watches, visors, and the like), one or more processing units or other integrated circuits or chip sets, or other electronic devices. As illustrated in the example of FIG. 1, source device 4 may include communication module 10, graphics processing unit (GPU) 12, streaming module 14, and application modules 18A-18N.

Source device 4 may include communication module 10 which may manage communications between source device 4 and one or more external devices, such as sink device 6. For instance, communication module 10 may exchange data with sink device 6 over communication channel 8. As one example, communication module 10 may stream graphical command tokens to sink device 6 over communication channel 8. In some examples, communication module 10 may receive information to be transmitted from other components of source device 4. For example, communication module 10 may receive graphical command tokens from streaming module 14.

Source device 4 may include GPU 12 which may render frames of video data based on one or more texture elements and graphical command tokens. Some examples of graphical commands which may be tokenized and performed by GPU 12 include, but are not limited to, the DirectX® API by Microsoft®, the Vulkan® API by the Khronos group, the OpenGL® API by the Khronos group (e.g., The OpenGL® A Specification (Version 4.5 (Core Profile)—May 28, 2015), available at https://www.opengl.org/registry/doc/glspec45.core.pdf), and the OpenCL™ API by the Khronos group (e.g., The OpenCL Specification, Version 2.1, Khronos OpenCL Working Group, Jan. 29, 2015, available at https://www.khronos.org/registry/cl/specs/opencl-2.1.pdf). In some examples, GPU 12 may render frames of video data based on graphical command tokens and texture elements associated with one or more of application modules 18. For instance, GPU 12 may render frames of video data based on graphical command tokens generated by, and texture elements associated with, an application module of application modules 18 for output at a display operatively coupled to or included in source device 4.

Source device 4 may include streaming module 14, which may be configured to stream video data to one or more external devices. For instance, streaming module 14 may stream video data in the form of graphical command tokens and texture elements to sink device 6. In some examples, streaming module 14 may capture the graphical command tokens and/or texture elements 16 at an input of GPU 12. Streaming module 14 may output a bitstream that includes the graphical command tokens and one or more texture elements to communication module 10 for transmission to sink device 6.

Source device 4 may include application modules 18 which may each represent an application provided by an entity that manufactures source device 4 or software operating on source device 4 or an application developed by a third party for use with source device 4. Examples of application modules 18 may include applications for gaming, shopping, travel routing, maps, audio and/or video presentation, word processing, spreadsheets, weather, etc.

Source device 4 may include texture elements 16 which may be utilized by a GPU to render frames of video data. In some examples, one or more of texture elements 16 may be associated with a particular application module of application modules 18. For instance, where a gaming application of application modules 18 entails the slicing of falling fruit (e.g., watermelons, avocados, pineapples, etc.), example texture elements of texture elements 16 that may be associated with the gaming application include a graphical representation of each of the types of fruit. In some examples, texture elements 16 may be stored in a plurality of formats. Some example formats include, but are not limited to, RGBα 8888, RGBα 4444, RGBα 5551, RGB 565, Yα 88, and α 8.

WD 2 may include sink device 6, which may be configured to receive video data in the form of graphical command tokens from a source device, such as source device 4, over a communication channel, such as communication channel 8. Examples of sink device 6 may include, but are not limited to mobile devices such as smartphones or other mobile handsets, tablet computers, laptop computers, desktop computers, wearable computing devices (e.g., smart watches, visors, and the like), televisions, monitors, one or more processing units or other integrated circuits or chip sets, or other electronic devices. As illustrated in the example of FIG. 1, sink device 6 may include communication module 19, graphics processing unit (GPU) 20, streaming module 22, and texture elements 24.

Sink device 6 may include communication module 19, which may manage communications between sink device 6 and one or more external devices, such as source device 4. In some example, communication module 19 may perform operations similar to communication module 10 of source device 4. For instance, communication module 19 may exchange data with source device 4 over communication channel 8. As one example, communication module 19 may receive graphical command tokens and texture elements from source device 4 over a direct Wi-Fi connection. In some examples, communication module 19 may provide received information to other components of sink device 6. For example, communication module 19 may provide received graphical command tokens and texture elements to streaming module 22.

Sink device 6 may include GPU 20, which may perform operations similar to GPU 12 of source device 4. For instance, GPU 20 may render frames of video data based on one or more texture elements and graphical command tokens. In some examples, GPU 20 may be capable of performing the same graphical commands as GPU 12. Some examples of graphical commands which may be performed by GPU 20 include, but are not limited to, the DirectX® API by Microsoft®, the OpenGL® API by the Khronos group, and the OpenCL™ API. In some examples, GPU 20 may render frames of video data based on graphical command tokens and texture elements received from one or more other components of sink device 6, such as streaming module 22. For instance, GPU 20 may render frames of video data based on graphical command tokens and texture elements received from streaming module 22 for output at a display operatively coupled to or included in sink device 6.

Sink device 6 may include streaming module 22 which may be configured to receive streaming video data from one or more external devices. For instance, streaming module 22 may receive streaming video data in the form of graphical command tokens and texture elements from source device 4.

Sink device 6 may store texture elements 24, which may be utilized by a GPU to render frames of video data. In some examples, streaming module 22 may store texture elements received from source device 4 in texture elements 24.

A user of source device 4 may desire to stream video from source device 4 to sink device 6. For instance, where a size of a display of source device 4 is smaller than a size of a display of sink device 6, the user of source device 4 may desire to utilize the larger display of sink device 6 to output the video. However, it may not be desirable to transmit constructed frames of video data from source device 4 to sink device 6, e.g., due to bandwidth restrictions, processing power, and the like. As such, streaming module 14 source device 4 may output graphical command tokens and one or more texture elements to streaming module 22 of sink device 6 via communication channel 8 in order to cause GPU 20 of sink device 6 to render frames of video data. In this way, as opposed to streaming video data in the pixel domain, source device 4 may stream video data to sink device 6 in the graphics domain, e.g., by streaming graphical commands and texture elements.

In some examples, it may be desirable to modify the video data output at the display of sink device 6. To avoid a degraded streaming experience, it may be desirable to perform the modification in real-time (or in near real-time). Additionally, it may be desirable for the modification to be application-independent. That is, it may be desirable for the modification to occur without the involvement of the application that generated the video data (i.e., such that the application that generated the video data need not be installed on the sink device). In accordance with one or more techniques of this disclosure, streaming module 22 of sink device 6 may modify graphical command tokens in order to cause GPU 20 to render modified video data.

In operation, source device 4 may receive original graphical command tokens and one or more texture elements that are renderable into original video data. For instance, streaming module 14 of source device 4 may receive the original graphical command tokens by capturing the graphical command tokens at an input of GPU 12 of source device 4. Streaming module 14 of source device 4 may output a bitstream that includes the original graphical command tokens and one or more texture elements to streaming module 22 of sink device 6 via communication channel 8.

Streaming module 22 of sink device 6 may receive the original graphical command tokens from source device 4. For instance, streaming module 22 may wirelessly receive the bitstream via communication module 19. In accordance with one or more techniques of this disclosure, streaming module 22 may modify the original graphical command tokens to generate modified graphical command tokens and cause GPU 20 to execute the modified graphical command tokens to render modified video data that is different than the original video data. In this way, sink device 6 may modify the original graphical command tokens (e.g., in real-time) to cause GPU 20 to render modified video data (i.e., while remaining application-independent).

Figure 2:
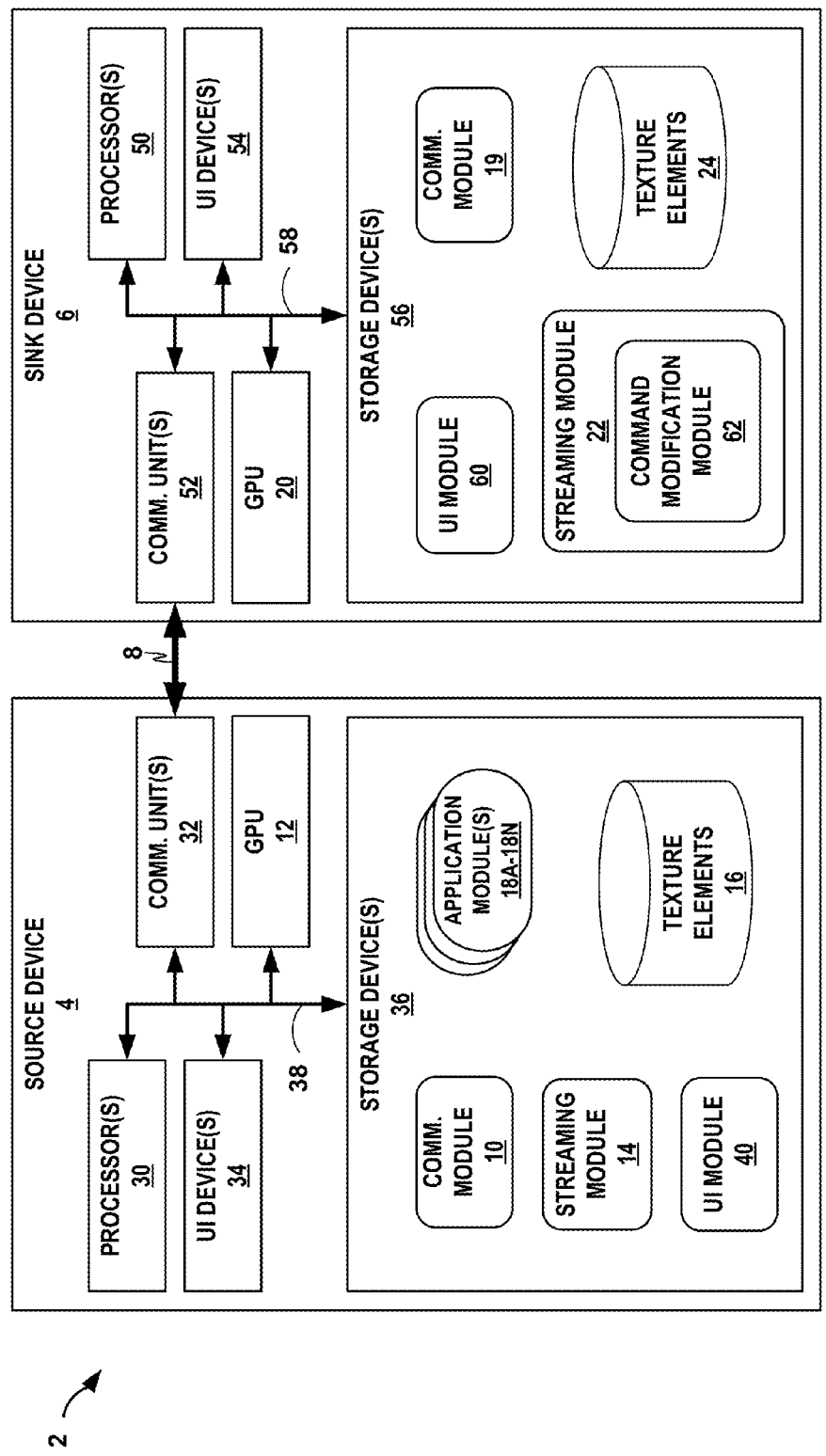
FIG. 2 is a block diagram illustrating further details of one example of source device and sink device of FIG. 1 in which the source device is configured to stream video data to the sink device over communication channel, in accordance with one or more techniques of the present disclosure.

FIG. 2 is a block diagram illustrating further details of one example of source device 4 and sink device 6 of FIG. 1 in which source device 4 is configured to stream video data to sink device 6 over communication channel 8, in accordance with one or more techniques of the present disclosure.

As illustrated in FIG. 2, source device 4 may include one or more processors 30, one or more communication units 32, one or more user interface (UI) devices 34, and one or more storage devices 36. Each of components 30, 32, 34, and 36 may be interconnected (physically, communicatively, and/or operatively) via communication channels 38 for inter-component communications. In some examples, communication channels 38 may include a system bus, network connection, inter-process communication data structure, or any other channel for communicating data. One or more of storage devices 36, in some examples, may include communication module 10, streaming module 14, one or more application modules 18A-18N (collectively, "application modules 18"), and UI module 40.

One or more processors 30 (i.e., processor(s) 30), in one example, are configured to implement functionality and/or process instructions for execution within source device 4. For example, processors 30 may be capable of processing instructions stored in one or more of storage devices 36. Examples of processors 30 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Source device 4, in some examples, also includes ones or more communication units 32. Source device 4, in one example, utilizes one or more of communication units 32 to communicate with external devices via one or more networks, such as one or more wireless networks. One or more of communication units 32 may be a network interface card, such as an Ethernet card, an optical transceiver, a radio frequency transceiver, or any other type of device that can send and receive information. Other examples of such network interfaces may include Bluetooth, 3G, and Wi-Fi radios. In some examples, source device 4 utilizes communication unit 32 to wirelessly communicate with an external device. For instance, source device 4 may utilize communication unit 32 to wirelessly communicate with communication unit 52 of sink device 6 over communication channel 8. In some examples, communication unit 32 may receive input from other components of source device 4, such as communication module 10, which causes communication unit 32 to communicate with an external device.

Source device 4, in some examples, may also include one or more UI devices 34. In some examples, one or more of UI devices 34 can be configured to output content, such as video data. For instance, a display of UI devices 34 may be configured to display frames of video data rendered by GPU 12. In addition to outputting content, one or more of UI devices 34 may be configured to receive tactile, audio, or visual input. Some examples of UI devices 34 include video displays, speakers, keyboards, touch screens, mice, trackballs, or other pointing devices, cameras, and the like.

Source device 4, in some examples, may also include UI module 40. UI module 40 can perform one or more functions to receive, content, such as UI data from other components associated with source device 4 and cause one or more of UI devices 34 to output the content. In some examples, UI module 40 may be configured to receive an indication of input, such as user input, and send the indications of the input to other components associated with source device 4, such as streaming module 14.

One or more storage devices 36 may be configured to store information within source device 4 during operation. One or more of storage devices 36, in some examples, may comprise a computer-readable storage medium. In some examples, one or more of storage devices 36 may comprise a temporary memory, meaning that a primary purpose of one or more of storage devices 36 is not long-term storage. One or more of storage devices 36, in some examples, may comprise a volatile memory, meaning that one or more of storage devices 36 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 36 is used to store program instructions for execution by processors 30. One or more of storage devices 36, in one example, may be used by software or modules running on source device 4 (e.g., communication module 10, streaming module 14, application modules 18, and UI module 40) to temporarily store information during program execution.

One or more of storage devices 36, in some examples, may also include one or more computer-readable storage media. One or more of storage devices 36 may further be configured for long-term storage of information. In some examples, one or more of storage devices 36 may include non-volatile storage elements. Examples of such non-volatile storage elements include magnetic hard discs, optical discs, flash memories, or forms of electrically programmable memories (EPROM) or electrically erasable and programmable (EEPROM) memories.

Sink device 6 may include one or more processors 50 (i.e., processor(s) 50), one or more communication units 52, one or more user interface (UI) devices 54, and one or more storage devices 56. Each of components 50, 52, 54, and 56 may be interconnected (physically, communicatively, and/or operatively) via communication channels 58 for inter-component communications. In some examples, communication channels 58 may include a system bus, network connection, inter-process communication data structure, or any other channel for communicating data. One or more of storage devices 56, in some examples, may include communication module 19, streaming module 22, texture elements 24, and UI module 60.

Processors 50, in some examples, may be configured to implement functionality and/or process instructions for execution within sink device 6. For example, processors 50 may be capable of processing instructions stored in one or more of storage devices 56. Examples of processors 50 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Sink device 6, in some examples, also includes ones or more communication units 52. Sink device 6, in one example, utilizes one or more of communication units 52 to communicate with external devices via one or more networks, such as one or more wireless networks. One or more of communication units 52 may be a network interface card, such as a USB transceiver, an Ethernet card, an optical transceiver, a radio frequency transceiver, or any other type of device that can send and receive information. Other examples of such network interfaces may include Bluetooth, 3G, and Wi-Fi radios. In some examples, sink device 6 utilizes communication unit 52 to wirelessly communicate with an external device. For instance, sink device 6 may utilize communication unit 52 to wirelessly communicate with communication unit 32 of source device 4 over communication channel 8. In some examples, communication unit 52 may provide received data to other components of sink device 6, such as communication module 19.

Sink device 6, in some examples, may also include one or more UI devices 54. In some examples, one or more of UI devices 54 can be configured to output content, such as video data. For instance, a display of UI devices 54 may be configured to display frames of video data rendered by GPU 20. In addition to outputting content, one or more of UI devices 54 may be configured to receive tactile, audio, or visual input. Some examples of UI devices 54 include video displays, speakers, keyboards, touch screens, mice, cameras, and the like.

Sink device 6, in some examples, may also include UI module 60. UI module 60 can perform one or more functions to receive, content, such as UI data from other components associated with sink device 6 and cause one or more of UI devices 54 to output the content. In some examples, UI module 60 may be configured to receive an indication of input, such as user input, and send the indications of the input to other components associated with sink device 6, such as streaming module 14.

One or more storage devices 56 may be configured to store information within sink device 6 during operation. One or more of storage devices 56, in some examples, may comprise a computer-readable storage medium. In some examples, one or more of storage devices 56 may comprise a temporary memory, meaning that a primary purpose of one or more of storage devices 56 is not long-term storage. One or more of storage devices 56, in some examples, may comprise a volatile memory, meaning that one or more of storage devices 56 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 56 is used to store program instructions for execution by processors 50. One or more of storage devices 56, in one example, may be used by software or modules running on sink device 6 (e.g., communication module 19, streaming module 22, and UI module 60) to temporarily store information during program execution.

One or more of storage devices 56, in some examples, may also include one or more computer-readable storage media. One or more of storage devices 56 may further be configured for long-term storage of information. In some examples, one or more of storage devices 56 may include non-volatile storage elements. Examples of such non-volatile storage elements include magnetic hard discs, optical discs, flash memories, or forms of electrically programmable memories (EPROM) or electrically erasable and programmable (EEPROM) memories.

As discussed above, sink device 6 may include streaming module 22, which may be configured to receive streaming video data from one or more external devices. In some examples, streaming module 22 may include command modification module 62, which may be configured to modify one or more graphical command tokens. As described in further detail below, command modification module 62 may modify the graphical command tokens to generate modified graphical command tokens that are executable by GPU 20 to render modified video data.

Figure 3A:
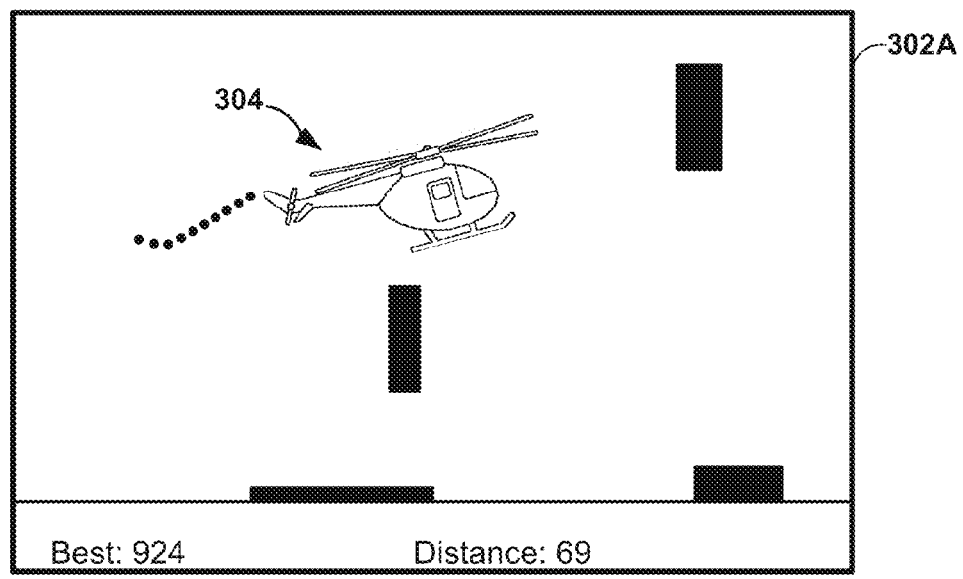
FIGS. 3A, 3B, 4A, 4B, 5A, 5B, and 6 are conceptual diagrams illustrating example modifications of graphical command tokens that may be performed by a device, in accordance with one or more aspects of the present disclosure.
Figure 4A:
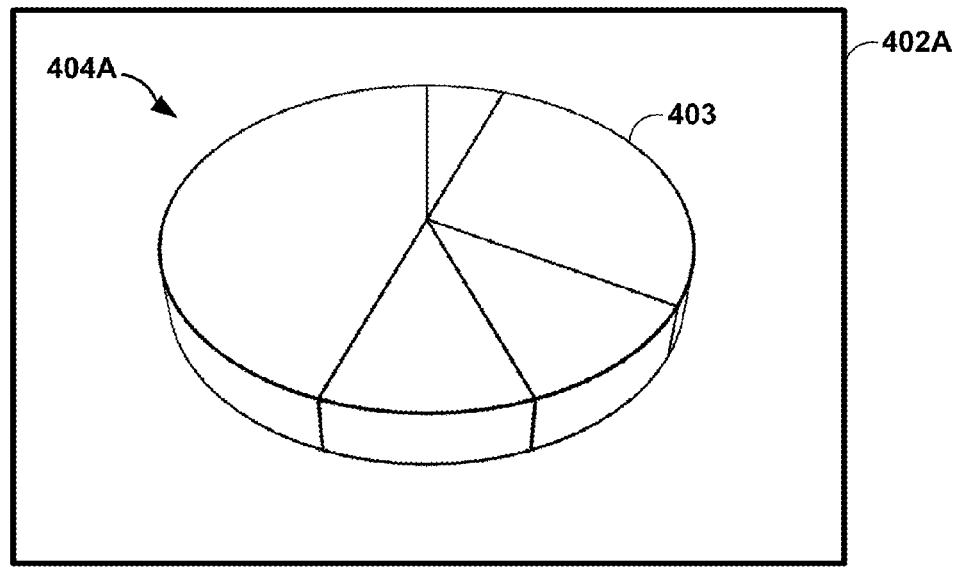
Figure 4B:
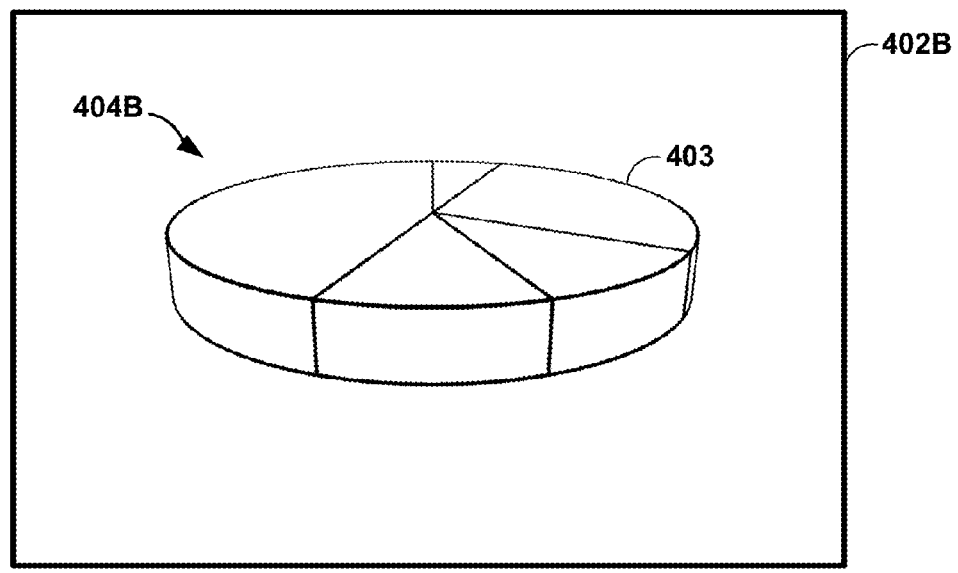
Figure 5A:
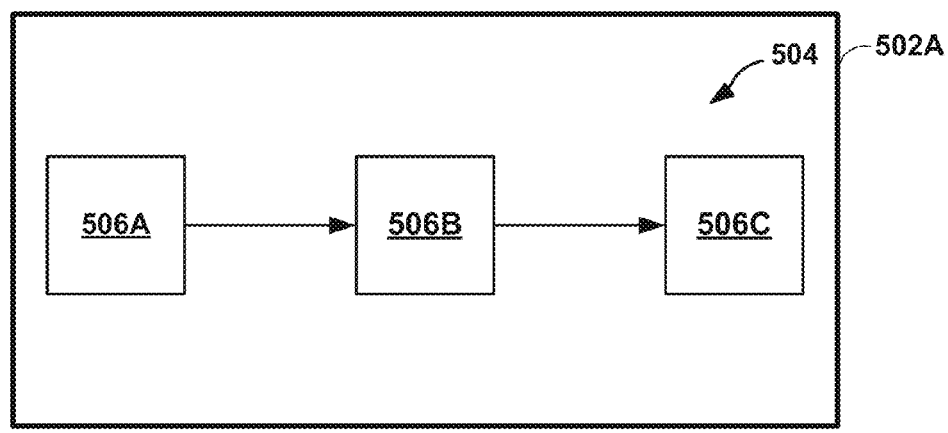
Figure 5B:
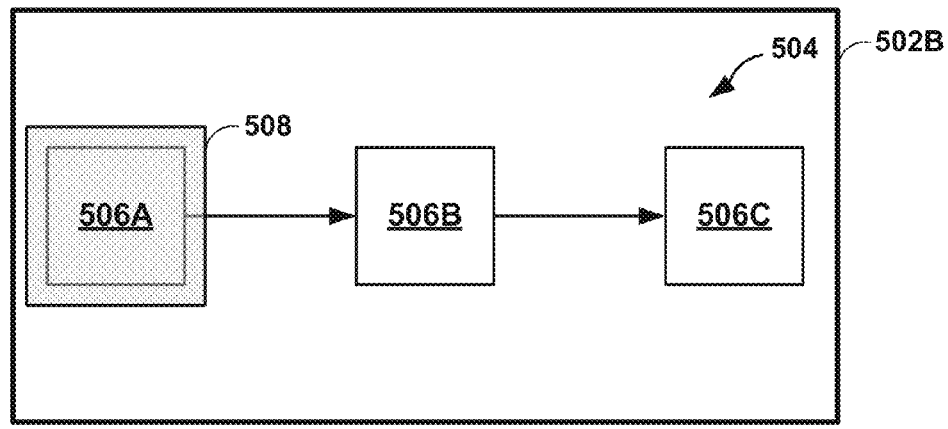
Figure 6:
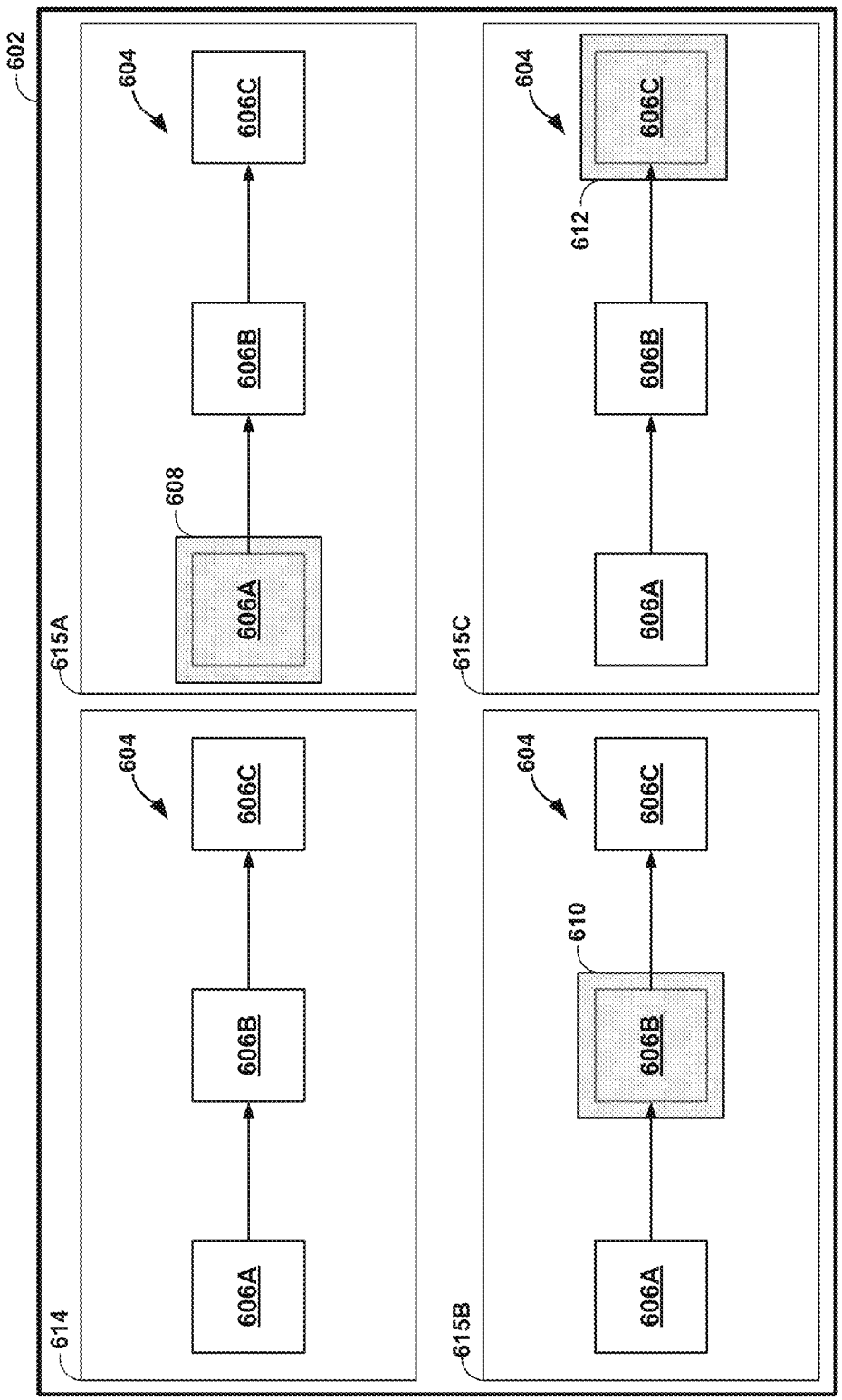

FIGS. 3A-6 are conceptual diagrams illustrating example modifications of graphical commands that may be performed by a device, in accordance with one or more aspects of the present disclosure. FIGS. 3A and 3B illustrate an example texture element replacement modification. FIGS. 4A and 4B illustrate an example three-dimensional (3D) viewpoint change modification. FIGS. 5A and 5B illustrate an example highlight modification. FIG. 6 illustrates an example split screen modification. For purposes of explanation, the modifications of FIGS. 3A, 3B, 4A, 4B, 5A, 5B and 6 are described within the context of sink device 6 illustrated in FIGS. 1 and 2, although computing devices having configurations different than that of sink device 6 may perform the modifications of FIGS. 3A, 3B, 4A, 4B, 5A, 5B and 6.

Figure 3B:
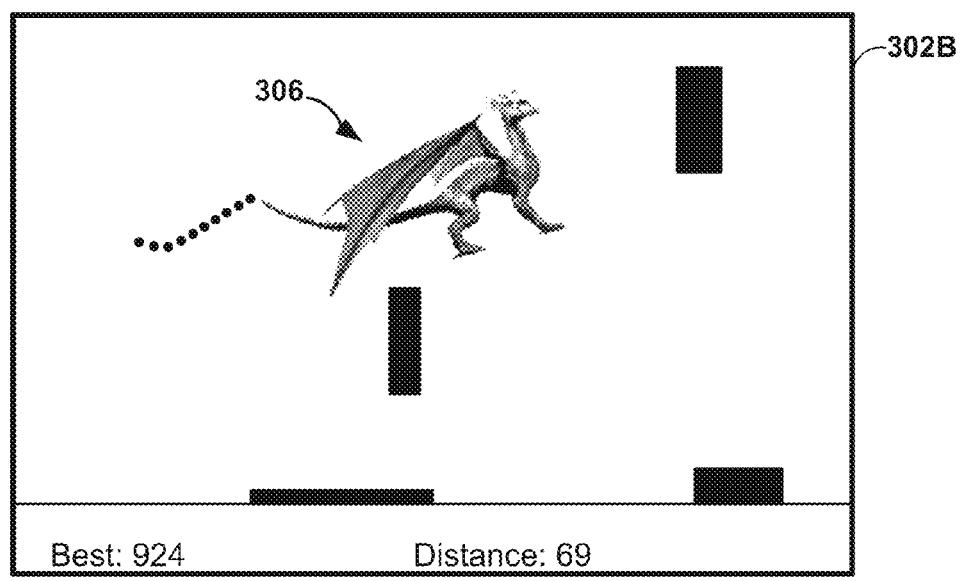

FIGS. 3A and 3B respectively illustrate frame 302A of original video data rendered based on original graphical command tokens and frame 302B of modified video data rendered based on modified graphical command tokens. Frame 302A may be displayed on a display device such as a display device of UI devices 54 of FIG. 2. As shown in FIG. 3A, frame 302A of the original video data may be rendered based on original graphical command tokens generated by a gaming application (e.g., an application module of application modules 18 of source device 4 of FIGS. 1 and 2) that involves flying a helicopter through various obstacles. To enable rendering of frame 302A of the original video data, one or more of the graphical command tokens generated by the gaming application may include references to helicopter texture element 304. For instance, one or more of the graphical command tokens generated by the gaming application may include a reference to a buffer that includes pixel values for helicopter texture element 304 (e.g., a glTexImage2D or glTexSubImage2D graphical command may include a pointer to a buffer).

As discussed above, streaming module 22 of sink device 6 may receive the original graphical command tokens from source device 4. In accordance with one or more techniques of this disclosure, sink device 6 may modify the original video data by replacing one or more texture elements included in the original video data. For instance, command modification module 62 may modify the one or more graphical command tokens generated by the gaming application to generate modified graphical command tokens by replacing references in the graphical command tokens to an original texture element with references to a replacement texture element that is different from the original texture element. In some examples, the replacement texture element may be included in texture elements 24. For instance, command modification module 62 may modify the pixel values for the original texture element in the buffer with pixel values for the replacement texture element. As one example, command modification module 62 may overwrite the pixel values in a buffer pointed to by a glTexImage2D or glTexSubImage2D graphical command with pixel values for the replacement texture element.

In the example of FIGS. 3A and 3B, when generating the modified graphical command tokens, command modification module 62 may replace references in the graphical command tokens to helicopter texture element 304 with references to dragon texture element 306. As shown in FIG. 3B, by replacing references to helicopter texture element 304 with references to dragon texture element 306, command modification module 62 may cause GPU 20 to render frame 302B of the modified video data with dragon texture element 306 in the place of helicopter texture element 304.

In some examples, sink device 6 may modify the original video data by changing a language of one or more texture elements. For instance, sink device 6 may perform optical character recognition (OCR) on an original texture element referenced by the original graphical command tokens to determine whether the original texture element includes text. If a language selected by a user of sink device 6 is different than text included in the original texture element, sink device 6 may generate a replacement texture element that includes a translation of the text into the language selected by the user of sink device 6 and replace references to the original texture element with references to the replacement texture element as described above.

FIGS. 4A and 4B respectively illustrate frame 402A of original video data rendered based on original graphical command tokens and frame 402B of modified video data rendered based on modified graphical command tokens. As shown in FIG. 4A, frame 402A of the original video data may be rendered based on original graphical command tokens generated by a presentation application (e.g., an application module of application modules 18 of FIGS. 1 and 2) that involves the presentation of three-dimensional (3D) pie-chart object 403. To enable rendering of frame 402A of the original video data, one or more of the graphical command tokens generated by the presentation application may cause 3D pie-chart object 403 to be rendered at first viewpoint 404A.

As discussed above, streaming module 22 of sink device 6 may receive the original graphical command tokens from source device 4. In accordance with one or more techniques of this disclosure, sink device 6 may modify the original video data by adjusting the viewpoint at which a 3D object is rendered. For instance, where original graphical command tokens are executable to render original video data that includes a representation of a 3D object from a first viewpoint, command modification module 62 may modify the one or more graphical command tokens by generating modified graphical command tokens that are executable to render modified video data to include a representation of the 3D object from a second viewpoint that is different than the first viewpoint. For instance, command modification module 62 may detect a graphical command that includes a transformation matrix for the 3D object (e.g., one of the glUniformMatrix4fv commands) and multiply the transformation matrix by the desired transformation. As one example, if the required viewpoint change is scaling by 3 in x, y, z directions (to enlarge the object), command modification module 62 may multiply the transformation matrix by [3 0 0 0; 0 3 0 0; 0 0 3 0; 0 0 0 1].

In the example of FIGS. 4A and 4B, command modification module 62 may generate modified graphical command tokens that cause 3D pie-chart object 403 to be rendered at second viewpoint 404B. As shown in FIG. 4B, by generating the modified graphical command tokens that cause 3D pie-chart object 403 to be rendered at second viewpoint 404B, command modification module 62 may cause GPU 20 to render frame 402B of the modified video data with 3D pie-chart object 403 at a different viewpoint than in frame 402A of the original video data.

FIGS. 5A and 5B respectively illustrate frame 502A of original video data rendered based on original graphical command tokens and frame 502B of modified video data rendered based on modified graphical command tokens. As shown in FIG. 5A, frame 502A of the original video data may be rendered based on original graphical command tokens generated by a presentation application (e.g., an application module of application modules 18 of FIGS. 1 and 2) that involves the presentation of flow-diagram 504 that includes blocks 506A-506C (collectively, "blocks 506").

As discussed above, streaming module 22 of sink device 6 may receive the original graphical command tokens from source device 4. In accordance with one or more techniques of this disclosure, sink device 6 may modify the original video data by highlighting one or more regions of the original video data. For instance, command modification module 62 may modify the original graphical command tokens by generating modified graphical command tokens that are executable to render modified video data that includes a highlight overlaid on the original video data. As one example, where the original graphical command tokens are executable to render the original video data as tiles of original texture elements, command modification module 62 may modify pixel values for one or more of the original texture elements in a buffer referenced by one or more of the original graphical command tokens with pixel values for a replacement texture element that includes the highlight overlay.

In the example of FIGS. 5A and 5B, command modification module 62 may generate modified graphical command tokens that cause highlight box 508 to be rendered on top of block 506A of flow-diagram 504. As shown in FIG. 5B, by generating the modified graphical command tokens that cause highlight box 508 to be rendered on top of block 506A of flow-diagram 504, command modification module 62 may cause GPU 20 to render frame 502B of the modified video data with additional emphasis on block 506A.

FIG. 6 illustrates frame 602 of modified video data that is rendered based on modified graphical command tokens. As discussed above, streaming module 22 of sink device 6 may receive the original graphical command tokens from source device 4. In accordance with one or more techniques of this disclosure, as opposed to presenting a single version of a frame of modified video data, sink device 6 may simultaneously present multiple versions of a frame of video data at a single display device. For instance, command modification module 62 may generate one or more sets of modified graphical command tokens, and cause GPU 20 to execute the one or more sets of the modified graphical command tokens to render one or more versions of modified video data at different regions of a single frame of modified video data.

In the example of FIG. 6, command modification module 62 may receive one or more original graphical command tokens executable to render frame 614 of original video data that includes blocks 606A-606C (collectively, "blocks 606") of flow diagram 604. Command modification module 62 may modify the original graphical command tokens to generate a first set of modified graphical command tokens that are executable to render frame 615A of modified video data that include blocks 606 with highlight box 608 over block 606A, a second set of modified graphical command tokens that are executable to render frame 615B of modified video data that includes blocks 606 with highlight box 608 over block 606B, and a third set of modified graphical command tokens that are executable to render frame 615C of modified video data that includes blocks 606 with highlight box 608 over block 606C.

Command modification module 62 may combine the original set of graphical command tokens along with the first, second, and third set of modified graphical command tokens and cause GPU 20 to execute the one or more sets of the modified graphical command tokens to render a single frame of modified video data. As shown in FIG. 6, command modification module 62 may combine the sets of graphical command tokens such that GPU 20 renders frame 614A of the original video data in the top-left quarter of frame 602, frame 615A of modified video data in the top-right quarter of frame 602, frame 615B in the bottom-left quarter of frame 602, and frame 615C in the bottom-right quarter of frame 602. In this way, command modification module 62 may generate multiple sets of modified graphical command tokens from a single set of original graphical command tokens (i.e., from a single bitstream).

It should be understood that the modifications described with reference to FIGS. 3A-6 are only examples and that other types of modifications are possible. As one example, sink device 6 may modify the graphical command tokens such that the modified video data is rendered with image processing point operations (e.g., color conversions such as Grayscale, blurring, sharpening, etc.). As another example, sink device 6 may modify the graphical command tokens such that the modified video data is rendered with the appearance of being processed with one or more image processing filters, such as one or more photographic filters (e.g., Instagram-like filters). As another example, sink device 6 may modify the graphical command tokens to perform resolution changes (e.g., to render at larger resolution, for partial covering of the display to allow multiple apps, etc.).

In some examples, the modifications performed by sink device 6 may be for any application (for example, Grayscale effect). In some examples, the modifications performed by sink device 6 may be application-specific (for example, changing 3D viewpoint of a specific object in a specific application). The modifications performed by sink device 6 can be partial or for the whole view (for example, adding an effect on figures of a PDF document in Adobe Reader but not on text). The modifications performed by sink device 6 can be adaptive (for example, a web browser output at the display of the sink device may include a whole webpage if viewed by company employees, but may blur certain parts if viewed by guests).

Figure 7:
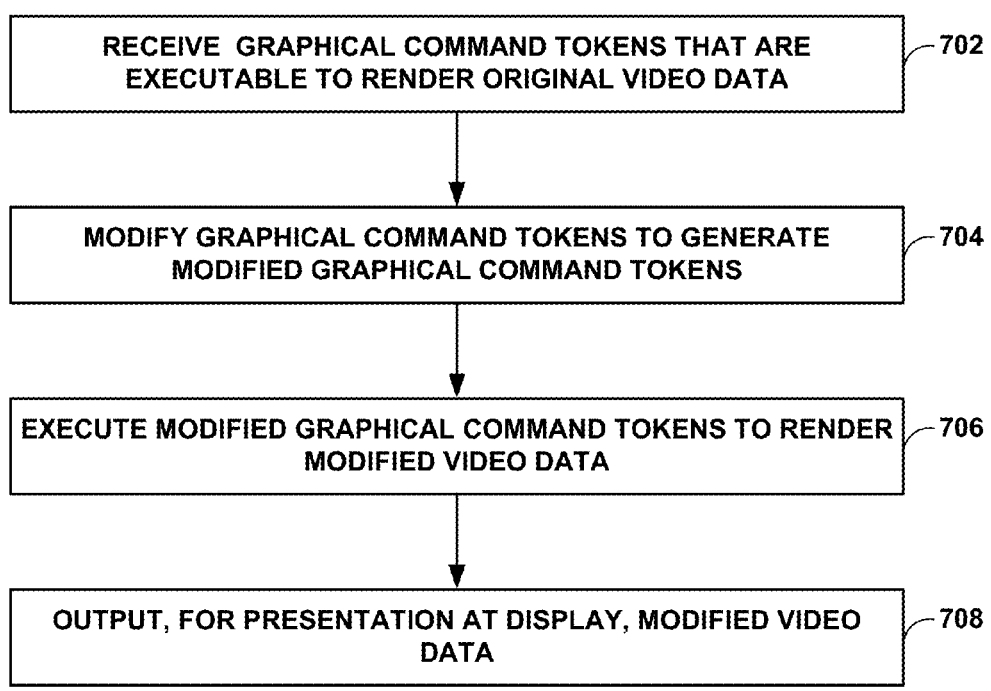
FIG. 7 is a flow diagram illustrating example operations of a sink device to process video data, in accordance with one or more techniques of the present disclosure.

FIG. 7 is a flow diagram illustrating example operations of a sink device to process video data, in accordance with one or more techniques of the present disclosure. The techniques of FIG. 7 may be performed by one or more processors of a computing device, such as sink device 6 illustrated in FIGS. 1 and 2. For purposes of illustration, the techniques of FIG. 7 are described within the context of sink device 6 illustrated in FIGS. 1 and 2, although computing devices having configurations different than that of sink device 6 may perform the techniques of FIG. 7.

In accordance with one or more techniques of this disclosure, sink device 6 may receive, from a source device, graphical command tokens that are executable to render original video data (702). For instance, one or more of processors 50 of sink device 6 may execute streaming module 22 to wirelessly receive a bitstream that includes the graphical command tokens from a source device, such as source device 4. In some examples, the bitstream received by sink device 6 may also include one or more texture elements.

Sink device 6 may modify the graphical command tokens to generate modified graphical command tokens (704). For instance, one or more of processors 50 may execute command modification module 62 to generate modified graphical command tokens that are executable to render modified video data. In some examples, one or more of processors 50 may execute command modification module 62 to generate the modified graphical command tokens by modifying graphical command tokens included in the received bitstream. In some examples, one or more of processors 50 may execute command modification module 62 to generate the modified graphical command tokens by inserting additional graphical command tokens into the received bitstream. In some examples the original video data and the modified video data may be a sequence of frames of video data. In some examples the original video data and the modified video data may be a single frame of video data.

One or more of processors 50 may execute command modification module 62 to perform a wide-variety of modifications. Some example modifications that command modification module 62 may be executed to perform include, but are not limited to, replacing texture elements (e.g., the example of FIGS. 3A and 3B), viewpoint changes for 3D objects (e.g., the example of FIGS. 4A and 4B), image processing point operations (e.g., the example of FIGS. 5A and 5B), image processing filters with artistic effects, and resolution changes.

In any case, sink device 6 may execute the modified graphical command tokens to render modified video data (706) and output, for presentation at a display, the modified video data (708). For instance, one or more of processors 50 may execute command modification module 62 to cause GPU 20 of sink device 6 to execute the modified graphical command tokens to render the modified video data and output the rendered modified video data at a display of UI devices 54 of sink device 6.

The following numbered examples may illustrate one or more aspects of the disclosure:

EXAMPLE 1

A method for processing video data comprising: receiving, by a sink device and from a source device, one or more graphical command tokens that are executable to render original video data based on one or more texture elements; modifying, by the sink device, the graphical command tokens to generate modified graphical command tokens that are executable to render modified video data different from the original video data; and outputting, for presentation at a display operatively connected to the sink device, the modified video data.

EXAMPLE 2

The method of example 1, wherein receiving the graphical command tokens comprises: wirelessly receiving the graphical command tokens from the source device.

EXAMPLE 3

The method of any combination of examples 1-2, further comprising: replacing one or more of the received texture elements with one or more replacement texture elements that are different from the one or more received texture elements such that the modified video data is based on the one or more replacement texture elements.

EXAMPLE 4

The method of any combination of examples 1-3, wherein the original video data includes a representation of a three-dimensional (3D) object from a first viewpoint, and wherein modifying the graphical command tokens comprises: modifying the graphical command tokens such that the modified video data includes a representation of the 3D object from a second viewpoint that is different than the first viewpoint.

EXAMPLE 5

The method of any combination of examples 1-4, wherein modifying the graphical command tokens to generate modified graphical command tokens that are executable to render modified video data comprises modifying the graphical command tokens to generate first modified graphical command tokens that are executable to render first modified video data, and wherein outputting the modified video data comprises outputting the first modified video data for presentation at a first portion of the display, the method further comprising: modifying the graphical command tokens to generate second modified graphical command tokens that are executable to render second modified video data that is different than the original video data and the first modified video data; and outputting the second modified video data for presentation at a second portion of the display that is different than the first portion.

EXAMPLE 6

The method of any combination of examples 1-5, wherein generating the modified graphical command tokens comprises: generating the modified graphical command tokens such that the modified video data is rendered with the appearance of being processed with a photographic filter.

EXAMPLE 7

The method of any combination of examples 1-6, wherein modifying the graphical command tokens comprises modifying the graphical command tokens in real-time.

EXAMPLE 8

A sink device comprising a communication unit configured to receive, from a source device, graphical command tokens that are executable to render original video data based on one or more texture elements; and one or more processors configured to perform the method of any combination of examples 1-7.

EXAMPLE 9

A sink device comprising means for performing the method of any combination of examples 1-7.

EXAMPLE 10

A computer-readable storage medium storing instructions that, when executed, cause one or more processors of a sink device to perform the method of any combination of examples 1-7.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various examples have been described. These and other examples are within the scope of the following claims.

What is claimed is:

1. A method for processing video data streamed by a source device to a sink device, the method comprising:
receiving, by the sink device and from the source device, one or more graphical command tokens generated by an application of the source device, wherein the one or more graphical command tokens are executable to render original video data, and wherein the graphical command tokens are instances of commands of a graphics application programming interface (API);
modifying, by the sink device and independent of the application of the source device, the graphical command tokens to generate modified graphical command tokens that are executable to render modified video data different from the original video data;
rendering, by a GPU of the sink device, the modified graphical command tokens to generate the modified video data; and
outputting, for presentation at a display operatively connected to the sink device, the modified video data.

2. The method of claim 1, wherein receiving the graphical command tokens comprises:
wirelessly receiving the graphical command tokens from the source device.

3. The method of claim 1, further comprising:
receiving, by the sink device and from the source device, one or more texture elements, wherein the received one or more graphical command tokens are executable to render the original data based on the received one or more texture elements; and
replacing one or more of the received texture elements with one or more replacement texture elements that are different from the one or more received texture elements such that the modified video data is based on the one or more replacement texture elements.

4. The method of claim 1, wherein the original video data includes a representation of a three-dimensional (3D) object from a first viewpoint, and wherein modifying the graphical command tokens comprises:
modifying the graphical command tokens such that the modified video data includes a representation of the 3D object from a second viewpoint that is different than the first viewpoint.

5. The method of claim 1, wherein modifying the graphical command tokens to generate modified graphical command tokens that are executable to render modified video data comprises modifying the graphical command tokens to generate first modified graphical command tokens that are executable to render first modified video data, and wherein outputting the modified video data comprises outputting the first modified video data for presentation at a first portion of the display, the method further comprising:
modifying the graphical command tokens to generate second modified graphical command tokens that are executable to render second modified video data that is different than the original video data and the first modified video data; and
outputting the second modified video data for presentation at a second portion of the display that is different than the first portion.

6. The method of claim 1, wherein generating the modified graphical command tokens comprises:
generating the modified graphical command tokens such that the modified video data is rendered with the appearance of being processed with a photographic filter.

7. The method of claim 1, wherein modifying the graphical command tokens comprises modifying the graphical command tokens in real-time.

8. A sink device for processing video data streamed by a source device, the sink device comprising:
a communication unit configured to receive, from the source device, one or more graphical command tokens generated by an application of the source device, wherein the one or more graphical command tokens are executable to render original video data, and wherein the graphical command tokens are instances of commands of a graphics application programming interface (API);
one or more graphics processing units (GPUs); and
one or more processors configured to:
modify, independent of the application of the source device, the graphical command tokens to generate modified graphical command tokens that are executable to render modified video data;
cause the one or more GPUs to render the modified graphical command tokens to generate the modified video data; and
output, for presentation at a display operatively connected to the sink device, the modified video data.

9. The sink device of claim 8, wherein, to receive the graphical command tokens, the communication unit is configured to:
wirelessly receive the graphical command tokens from the source device.

10. The sink device of claim 8, wherein the communication unit is further configured to receive one or more texture elements, wherein the received one or more graphical command tokens are executable to render the original data based on the received one or more texture elements, and wherein the one or more processors are further configured to:
replace one or more of the received texture elements with one or more replacement texture elements that are different from the one or more received texture elements such that the modified video data is based on the one or more replacement texture elements.

11. The sink device of claim 8, wherein the original video data includes a representation of a three-dimensional (3D) object from a first viewpoint, and wherein, to modify the graphical command tokens, the one or more processors are configured to:
modify the graphical command tokens such that the modified video data includes a representation of the 3D object from a second viewpoint that is different than the first viewpoint.

12. The sink device of claim 8, wherein, to modify the graphical command tokens to generate modified graphical command tokens that are executable to render modified video data, the one or more processors are configured to modify the graphical command tokens to generate first modified graphical command tokens that are executable to render first modified video data, and wherein, to output the modified video data, the one or more processors are configured to output the first modified video data for presentation at a first portion of the display, and wherein the one or more processors are further configured to:
modify the graphical command tokens to generate second modified graphical command tokens that are executable to render second modified video data that is different than the original video data and the first modified video data; and output the second modified video data for presentation at a second portion of the display that is different than the first portion.

13. The sink device of claim 8, wherein, to generate the modified graphical command tokens, the one or more processors are configured to:

generate the modified graphical command tokens such that the modified video data is rendered with the appearance of being processed with a photographic filter.

14. The sink device of claim 8, wherein, to modify the graphical command tokens, the one or more processors are configured to modify the graphical command tokens in real-time.

15. The sink device of claim 8, further comprising a memory storing instructions that, when executed, configures the one or more processors to:

modify the graphical command tokens; and output the modified video data.

16. A sink device for processing video data streamed by a source device, the sink device comprising:

means for receiving, from the source device, one or more graphical command tokens generated by an application of the source device, wherein the one or more graphical command tokens are executable to render original video data, and wherein the graphical command tokens are instances of commands of a graphics application programming interface (API);

means for modifying, independent of the application of the source device, the graphical command tokens to generate modified graphical command tokens that are executable to render modified video data different from the original video data;

one or more graphics processing units (GPUs) configured to render the modified graphical command tokens to generate the modified video data; and means for outputting, for presentation at a display operatively connected to the sink device, the modified video data.

17. The sink device of claim 16, wherein the means for receiving the graphical command tokens comprise:

means for wirelessly receiving the graphical command tokens from the source device.

18. The sink device of claim 16, further comprising:

means for receiving, from the source device, one or more texture elements, wherein the received one or more graphical command tokens are executable to render the original data based on the received one or more texture elements; and means for replacing one or more of the received texture elements with one or more replacement texture elements that are different from the one or more received texture elements such that the modified video data is based on the one or more replacement texture elements.

19. The sink device of claim 16, wherein the original video data includes a representation of a three-dimensional (3D) object from a first viewpoint, and wherein the means for modifying the graphical command tokens comprise:

means for modifying the graphical command tokens such that the modified video data includes a representation of the 3D object from a second viewpoint that is different than the first viewpoint.

20. The sink device of claim 16, wherein the means for modifying the graphical command tokens to generate modified graphical command tokens that are executable to render modified video data comprise means for modifying the graphical command tokens to generate first modified graphical command tokens that are executable to render first modified video data, and wherein the means for outputting the modified video data comprise means for outputting the first modified video data for presentation at a first portion of the display, the sink device further comprising:

means for modifying the graphical command tokens to generate second modified graphical command tokens that are executable to render second modified video data that is different than the original video data and the first modified video data; and means for outputting the second modified video data for presentation at a second portion of the display that is different than the first portion.

21. The sink device of claim 16, wherein the means for generating the modified graphical command tokens comprise:

means for generating the modified graphical command tokens such that the modified video data is rendered with the appearance of being processed with a photographic filter.

22. The sink device of claim 16, wherein the means for modifying the graphical command tokens comprise means for modifying the graphical command tokens in real-time.

23. A non-transitory computer-readable storage medium storing instructions that, when executed, cause one or more processors of a sink device for processing video data streamed by a source device to:

receive, from the source device, one or more graphical command tokens generated by an application of the source device, wherein the one or more graphical command tokens are executable to render original video data, and wherein the graphical command tokens are instances of commands of a graphics application programming interface (API);

modify, independent of the application of the source device, the graphical command tokens to generate modified graphical command tokens that are executable to render modified video data different from the original video data;

cause one or more GPUs to render the modified graphical command tokens to generate the modified video data; and output, for presentation at a display operatively connected to the sink device, the modified video data.

24. The non-transitory computer-readable storage medium of claim 23, wherein the instructions that cause the one or more processors to receive the graphical command tokens comprises instructions that cause the one or more processors to wirelessly receive the graphical command tokens from the source device.

25. The non-transitory computer-readable storage medium of claim 23, further comprising instructions that cause the one or more processors to:

receive, from the source device, one or more texture elements, wherein the received one or more graphical command tokens are executable to render the original data based on the received one or more texture elements; and replace one or more of the received texture elements with one or more replacement texture elements that are different from the one or more received texture elements such that the modified video data is based on the one or more replacement texture elements.

26. The non-transitory computer-readable storage medium of claim 23, wherein the original video data includes a representation of a three-dimensional (3D) object from a first viewpoint, and wherein the instructions that cause the one or more processors to modify the graphical command tokens comprise instructions that cause the one or more processors to: modify the graphical command tokens such that the modified video data includes a representation of the 3D object from a second viewpoint that is different than the first viewpoint.

27. The non-transitory computer-readable storage medium of claim 23, wherein the instructions that cause the one or more processors to modify the graphical command tokens to generate modified graphical command tokens that are executable to render modified video data comprise instructions that cause the one or more processors to modify the graphical command tokens to generate first modified graphical command tokens that are executable to render first modified video data, and wherein the instructions that cause the one or more processors to output the modified video data comprise the instructions that cause the one or more processors to output the first modified video data for presentation at a first portion of the display, and further comprising instructions that cause the one or more processors to: modify the graphical command tokens to generate second modified graphical command tokens that are executable to render second modified video data that is different than the original video data and the first modified video data; and output the second modified video data for presentation at a second portion of the display that is different than the first portion.

28. The non-transitory computer-readable storage medium of claim 23, wherein the instructions that cause the one or more processors to generate the modified graphical command tokens comprise instructions that cause the one or more processors to: generate the modified graphical command tokens such that the modified video data is rendered with the appearance of being processed with a photographic filter.

29. The non-transitory computer-readable storage medium of claim 23, wherein the instructions that cause the one or more processors to modify the graphical command tokens comprise instructions that cause the one or more processors to modify the graphical command tokens in real-time.

* * * * *